(12) United States Patent
Ito

(10) Patent No.: US 6,325,431 B1
(45) Date of Patent: Dec. 4, 2001

(54) ROLL-FORMED PRODUCT AND VEHICLE BUMPER USING THE SAME

(75) Inventor: Haruki Ito, Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/556,322

(22) Filed: Apr. 24, 2000

(30) Foreign Application Priority Data

Apr. 22, 1999 (JP) .................................................. 11-115220
Jan. 31, 2000 (JP) .................................................. 12-021555

(51) Int. Cl.$^7$ ........................... B60R 19/18; B60R 19/04; E04C 3/32
(52) U.S. Cl. .......................... 293/102; 293/120; 293/121; 293/122; 52/730.1; 52/731.2; 52/732.1
(58) Field of Search ..................................... 293/102, 120, 293/121, 122; 52/730.1, 731.2, 732.1

(56) References Cited

U.S. PATENT DOCUMENTS

| | | | |
|---|---|---|---|
| 3,905,630 | * | 9/1975 | Cantrell ..................................... 23/98 |
| 4,116,480 | * | 9/1978 | Crestetto ................................. 293/98 |
| 4,160,562 | * | 7/1979 | Crestetto ................................. 293/120 |
| 5,080,410 | * | 1/1992 | Stewart et al. ........................ 293/102 |
| 5,306,058 | * | 4/1994 | Sturrus et al. ........................ 293/154 |
| 5,426,906 | * | 6/1995 | McCracken .......................... 52/650.1 |
| 5,462,325 | * | 10/1995 | Masuda et al. ....................... 293/102 |
| 5,722,708 | * | 3/1998 | Jonssson ............................... 293/102 |
| 6,042,163 | * | 3/2000 | Reiffer .................................. 293/155 |

FOREIGN PATENT DOCUMENTS

| | | |
|---|---|---|
| 691 00 316 T2 | 1/1994 | (DE) . |
| 0 449 599 B1 | 10/1991 | (EP) . |
| 7-246894 | 9/1995 | (JP) . |

* cited by examiner

Primary Examiner—Joseph D. Pape
Assistant Examiner—Greg Blankenship
(74) Attorney, Agent, or Firm—Burns, Doane, Swecker & Mathis, LLP

(57) ABSTRACT

A roll-formed product is formed from a steel sheet having a tensile strength of not greater than 400 MPa and is locally reinforced. Such a roll-formed product is excellent in formability and shock absorbing ability and is of high strength. The roll-formed product can be used as, for example, a vehicle bumper. The roll-formed vehicle bumper can also be made at a lower cost.

8 Claims, 10 Drawing Sheets

ROLL-FORMED PRODUCT AND VEHICLE BUMPER USING THE SAME

BACKGROUND OF THE INVENTION

1. Field of the Invention

The present invention is directed to a roll-formed product and a vehicle bumper using the same.

2. Prior Art

A roll-formed product which is in the form of a steel-made tubular configuration is widely used, in various fields, due to the fact that such a roll-formed product is very low in production cost. Today, there is a social request for producing the roll-formed product from much thinner steel sheet, which will contribute energy-saving. Meeting such a request, forming the roll-formed product can be achieved with the usage of a device which is produced at a low cost, with the result that together with a low cost of the raw material the provision of the roll-formed product at much lower cost becomes possible. However, sometimes employing the thinner steel sheet as the raw material of the roll-formed product may raise a problem in strength.

In the field of an automotive vehicle, roll-forming is used for manufacturing various components. In this field, each component is requested to be lightweight from a view point of improving fuel economy which leads to energy-saving. To comply with such a request, using thinner steel sheet is now on demand. However, each of the automotive vehicle components or parts must have a sufficient strength against an outer force applied thereto such as a collision impact or shock, which compels to use a steel sheet having an enough strength and a considerable thickness.

Typical roll-formed products used in automotive vehicles are vehicle bumpers. The vehicle bumper is secured to frontward and rearward sides of a vehicle body for the protection thereof upon collision. To absorb the shock upon collision, the vehicle bumper is requested to have a sufficient strength, while for improving the fuel economy the vehicle bumper has to be lightweight.

In the foregoing circumstances, Japanese Patent Laid-open Print No.Hei.07(1996)-246894 provides an end-closed tubular shaped vehicle bumper which is formed from a continually fed steel sheet having a tensile strength of not less than 6OKSI (413.7 MPa) and a thickness of not greater than 0.1 inches (2.54 mm).

However, using such a high tensile strength steel sheet brings restrictions with respect to roll-forming and cost when producing the roll -formed product. In detail, as the strength of the high tensile strength steel sheet increases, the formability becomes bad, thereby failing to constitute a designed outer profile of the roll-formed product and causing production problems such as lowering rolling speed and shortening the life of the rolling device. In addition, using the highly tensile steel sheet results in that the vehicle bumper becomes poor in shock absorbing ability.

SUMMARY OF THE INVENTION

In order to overcome the aforementioned problems or drawbacks, an object of the present invention is to provide a roll-formed product and a vehicle bumper using the same which are excellent in formability, which are of high strength causing an excellent shock absorbing ability, and which are produced at a low cost.

A first aspect of the present invention is to provide a roll-formed product which comprises:

a main body formed from a steel sheet having a tensile strength of not greater than 400 MPa; and one or more locally reinforced portions provided to the main body.

In accordance with the first aspect of the present invention, the following effects or results are produced:

The low strength steel sheet having a tensile strength of not greater than 400 MPa is excellent in formability, which makes it possible to design an outer profile of the roll-formed product free. In addition, the excellent formability improves the productivity when the roll-formed product is in production and an at-a-low-cost availability of the low strength steel sheet per se makes it possible to produce the roll-formed product at a lower cost. Moreover, the reinforced portions retain the strength of the roll-formed product, while otherwise portions absorb the shock, whereby the roll-formed product becomes excellent in strength and shock-absorbing ability.

A second aspect of the present invention is to modify the roll-formed product of the first aspect in such a manner that the main body is made up of a first high strength portion extending in a lengthwise direction and strengthened, a first low strength portion extending in the lengthwise direction in continuous with the first high strength portion such that a strength of the first low strength portion remains unchanged, a second high strength portion extending in the lengthwise direction in continuous with the first low strength portion and strengthened, and a second low strength portion extending in the lengthwise direction in continuous with such that a strength of the second low strength portion remains unchanged, the main body being characterized in that a summation of a projection area of the first high strength portion and a projection area of the second high strength portion occupies 20% or above of a projection region whose one end portion perpendicular to the lengthwise direction, a central portion, and the other end portion perpendicular to the lengthwise direction are in coincidence with the first high strength portion, either of the first low strength portion and the second low strength portion, and the second high strength portion, respectively.

In accordance with the second aspect of the present invention, the following effects or results are produced: Due to the fact that the roll-formed product is strengthened along its lengthwise direction, such strengthening can be made successively or continually, thereby producing the roll-formed product in good productivity and at a lower cost. In addition, the summation of the projected areas of the first high strength portion and the second strength portion occupies 20% and above of the projection region, the roll-formed product from the low strength steel sheet can be made to equivalent with one which is produced from a high strength steel sheet.

A third aspect of the present invention is to modify the roll-formed product of the first aspect in such a manner that at least one of the first high strength portion and the second high strength portion is in the form of either of a concave configuration and a convex configuration.

In accordance with the third aspect of the present invention, the following effects or results are produced: providing such a concave or convex portion can be made without adding any element to the roll-formed product, thereby making the roll-formed product in much easier way, with the result that strengthening the roll-formed product can be established at a lower cost such that the weight of the product remains unchanged. In addition, concave configuration strengthening makes it possible to reinforce or strengthen the roll-formed product without changing its outer profile.

A fourth aspect of the present invention is to modify the roll-formed product of the first aspect in such a manner that the first high strength portion and the second strength portion are reinforced by means of heat treatment of the main body.

In accordance with the fourth aspect of the present invention, employing the heat treatment for locally reinforcing the roll-formed product brings that the reinforcing per se is made to be easier.

A fifth aspect of the present invention is to modify the roll-formed product of the fourth aspect in such a manner that the heat treatment is high-frequency quenching hardening.

In accordance with the fifth aspect of the present invention, applying high-frequency energy makes it possible to reinforce desired portions of the roll-formed product, thereby lowering the production cost thereof.

A sixth aspect of the present invention is to modify the roll-forming product of any one of the first, second, third, fourth, and fifth aspects in such a manner that the main body is used as a bumper beam of a vehicle bumper.

In accordance with the sixth aspect of the present invention, the bumper beam is of high strength, is excellent in shock-absorbing ability, and is produced at a lower cost. Thus, the vehicle bumper including the bumper beam inevitably comes to have such merits.

A seventh aspect of the present invention is to modify the roll-forming product of the sixth aspect of the present invention in such a manner that the bumper beam is provided with a bumper cover for absorbing a shock upon collision.

In accordance with the seventh aspect of the present invention, the addition of the bumper cover makes the vehicle bumper more excellent in shock-absorbing ability.

BRIEF DESCRIPTION OF THE DRAWINGS

The above and other objects, features and advantages of the present invention will be more apparent and more readily appreciated from the following detailed description of preferred exemplary embodiments of the present invention, taken in connection with the accompanying drawings, in which.

DETAILED DESCRIPTION OF THE PRESENT INVENTION

Preferred embodiments of the present invention will be described hereinafter in detail with reference to the accompanying drawings.

Figure 1:
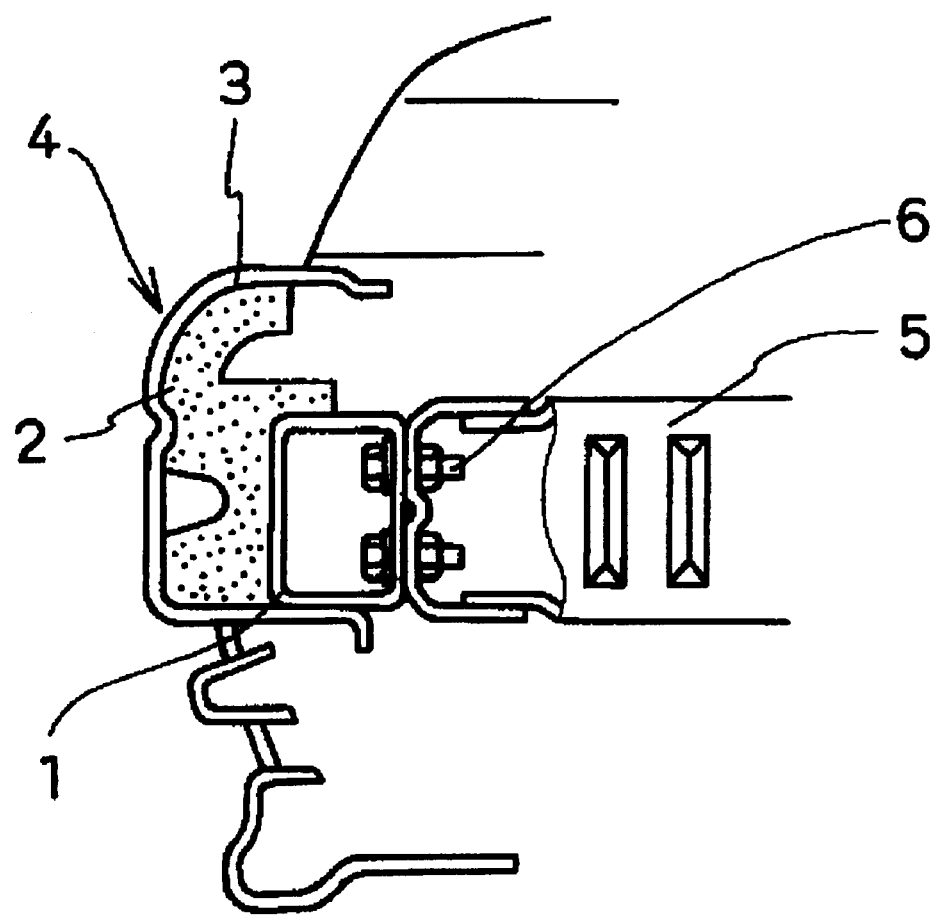
FIG. 1 illustrates an cross-sectional view of a frontward portion of a vehicle to which a vehicle bumper of the present invention is mounted.

First of all, with reference to FIG. 1, there is illustrated a cross-sectional view of a frontward portion of a vehicle body to which a vehicle bumper of the instant embodiment is secured. The bumper is made up of a bumper beam 1 and a bumper cover 3 connected thereto. The bumper cover 3 includes therein an absorber 2 which relieves a shock upon collision. The vehicle bumper is secured to the vehicle body in such a manner that the bumper beam 1 is fastened to side members 5 (only one is shown) of the vehicle body by means of mounting bolts 6.

Figure 2:
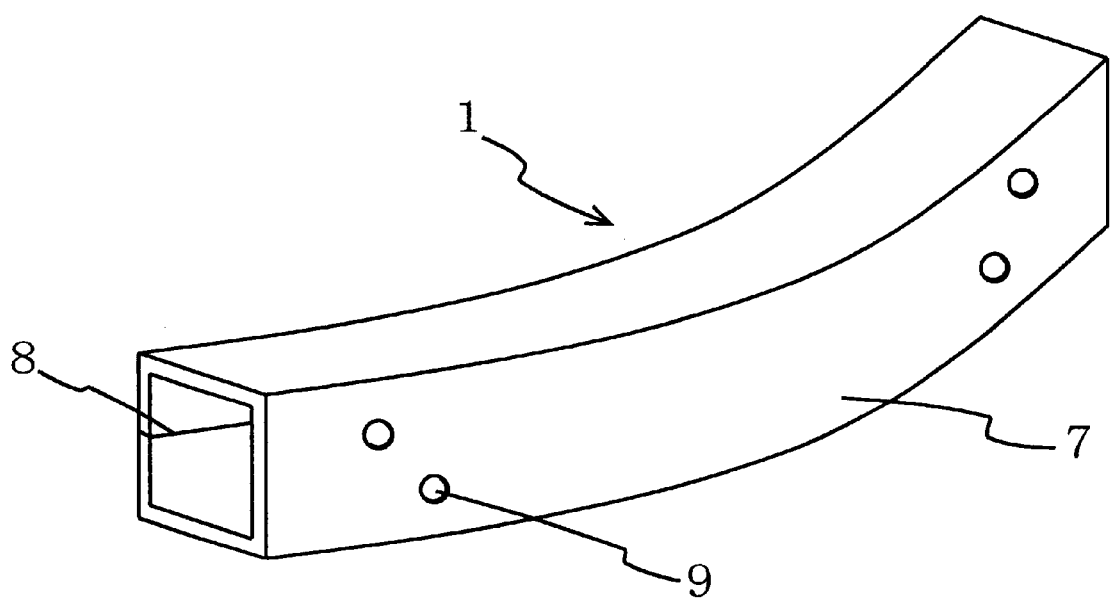
FIG. 2 illustrates a perspective view of a bumper beam which is a core element of the vehicle bumper shown in FIG. 1.

As shown in FIG. 2, the bumper beam 1 has a box-alike cross-section. Such a structure is obtained by roll-forming a flat sheet of low strength steel (not shown). In detail, while the flat sheet of low strength steel is being fed in a roll-forming machine (not shown), the sheet is angled at its four longitudinal lines and opposite longitudinal ends of the resulting sheet which constitute a connecting portion 8 are connected to each other, thereby forming a rectangular-tube-like bumper beam 1. Thereafter, the bumper beam 1 is cut to a size and is formed with holes 9 for passing therethrough the respective bolts 6.

Figure 3:
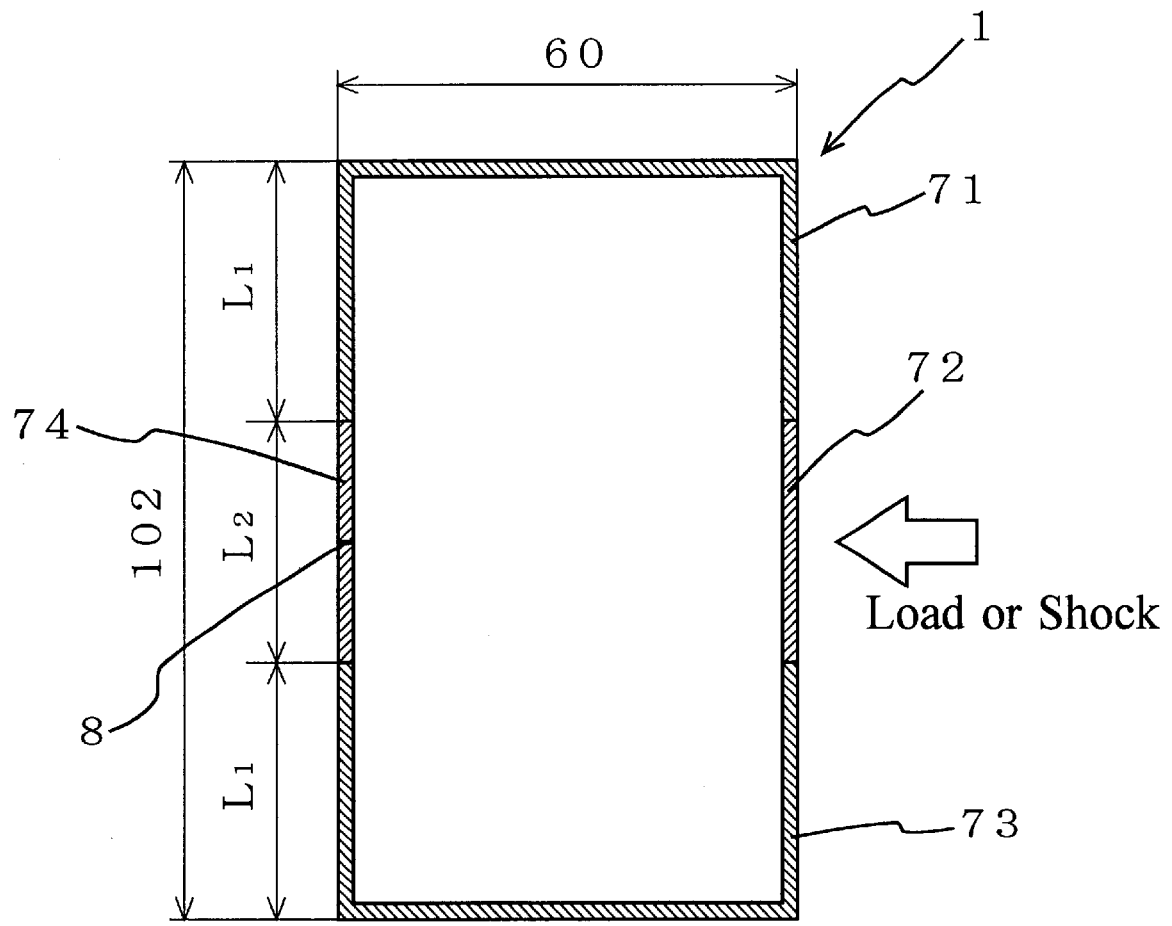
FIG. 3 illustrates a cross-sectional view of the bumper beam which is shown in FIG. 2.

Referring to FIG. 3, there is illustrated a vertical cross-sectional view of the bumper beam 1 along its lateral direction. The raw material or initial state of the low strength steel sheet 7 has a tensile strength value of not greater than 400 MPa. The bumper beam 1 is divided into a first high strength portion 71, a first low strength portion 72 which is continuous with the first high strength portion 71, a second high strength portion 73 which is continuous with the first high strength portion 72, and a second low strength portion 74 which is continuous with the second high strength portion 73. The first high strength portion 71, the first low strength portion 72, the second high strength portion 73, and the second low strength portion 74 extends in the longitudinal direction. The first high strength portion 71 and the second high strength portion 73 are reinforced in tensile strength by heating treatment of the bumper beam 1, while the first low strength portion 72 and the second low strength portion 74 are not reinforced and therefore the tensile strength thereof are identical with the tensile strength of the sheet steel 7.

Figure 4:
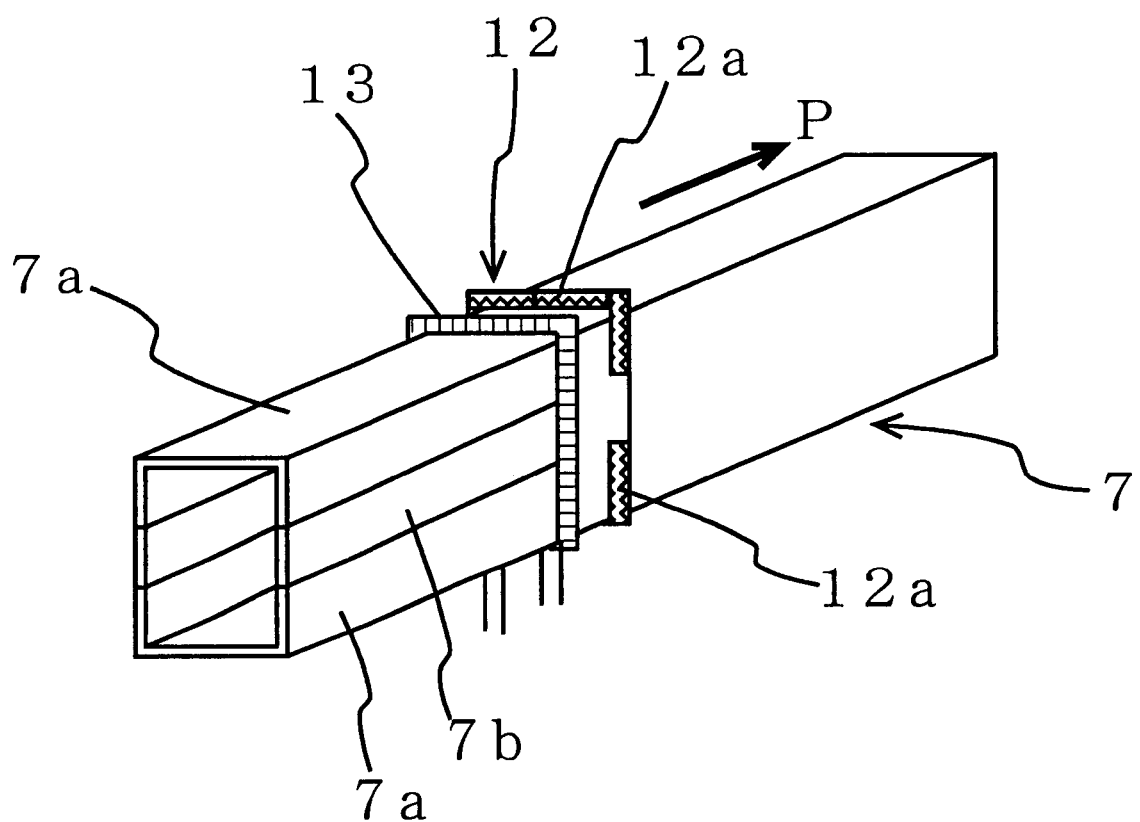
FIG. 4 illustrates how heat treatment is made on a portion of the bumper beam which is shown in FIG. 3.

Referring to FIG. 4, there is illustrated how the foregoing locally reinforced portions 71 and 73 are formed. In the illustration, as the heat treatment, a partial high-frequency quench hardening is employed. Of course, other heating treatments are acceptable so long as equivalent results can be produced thereby.

As described above, the low strength steel sheet 7 is formed into the rectangular tube by means of the roll-forming method. The tube-shaped steel 7 moves in a direction P so as to pass through a pair of juxtaposed split-ring type high-frequency coil 12 and cooling water circulation pipe 13. It is to be noted that unlike the illustrated tube-shape steel 7 the actual tube-shape steel 7 is in the form of an elongated form and is cut to a required or desired size after the heating treatment.

The high-frequency coil 12 includes coil portions 12a to emit a high-frequency electromagnetic wave to the portions 71 and 73 which are to be heat-treated. Other coil portions are not provided in the high-frequency coil 12 which correspond to the respective portions 72 and 74.

The low strength tubular steel 7 under movement is designed to enter or move into the cooling water circulation pipe 13 immediately after passing through the high-frequency coil 12. The portions 71 and 73 of the tubular steel which are heated to a high temperature by the coil portions 12a and 12a, respectively are cooled rapidly by a cooling or cold water ejected from the cooling water circulation pipe 13. Thus, such a quenching hardening forms the portions 71 and 73 into the first high strength portion and the second high strength portion, respectively. The strength of each of the portions 72 and 74 which are not heated by the coil 12 remains unchanged.

When a shock or load is applied to the thus-structured bumper beam 1, such a shock or load is received by the first high strength portion 71 and the second high strength portion 73 and deforms the first low strength portion 72 and the second low strength portion 74, with the result that the shock or load is absorbed by the bumper beam 1.

The low strength steel sheet 7 is low in rigidity, which makes it possible to angle the same easily, thereby establishing excellent formability. Thus, low strength steel sheet 7 can be formed into a desired shape easily with a good yield rate and less failure rate. In addition, less friction between the low strength steel sheet 7 and rollers of the rolling device, which prolongs the durability of the rolling device. Moreover, the speed-up of the roll-forming becomes possible, thereby increasing the productivity of the roll-forming operation. Furthermore, the sheet 7 is inexpensive. In light of these advantageous matters, even though the heating treatment is added, the cost of the formation of the foregoing bumper beam 1 becomes lower when compared to the production cost of the conventional bumper beam.

The effects or results produced by the instant embodiment and a comparative example, respectively, are explained hereinafter when a shock is applied thereto.

A bumper beam 11 of the instant embodiment for the test has a rectangular prism dimension of 60 mm width (horizontal length in FIG. 3)×102 mm height (vertical length in FIG. 3)×1150 mm (length). As the raw material of the bumper beam 11, a low strength steel sheet rated at SPCC390 according to Japanese Industrial Standard is used. This low strength steel sheet has a thickness of 1.4 mm and a tensile strength of 390 MPa. First high strength portion 71 and second high strength portion 73 of the bumper beam 11 are reinforced by means of high-frequency quenching hardening and has an average tensile strength of 1006 MPa. This value is obtained by measuring strengths of cutout parts of the high strength portions 71 and 73.

The first high strength portion 71, the first low strength portion 72, and the second high strength portion 73 at the right side in FIG. 3 are set to be 34 mm, 34 mm, and 34 mm, respectively, while the first high strength portion 71, the second low strength portion 74, and the second high strength portion 73 at the left side are set to be 34 mm, 34 mm, and 34 mm, respectively. Thus, the right side of the bumper beam 11 is divided into three equal portions 71, 72, and 73, while the left side is divided into three equal portions 71, 74, and 73.

Figure 5:
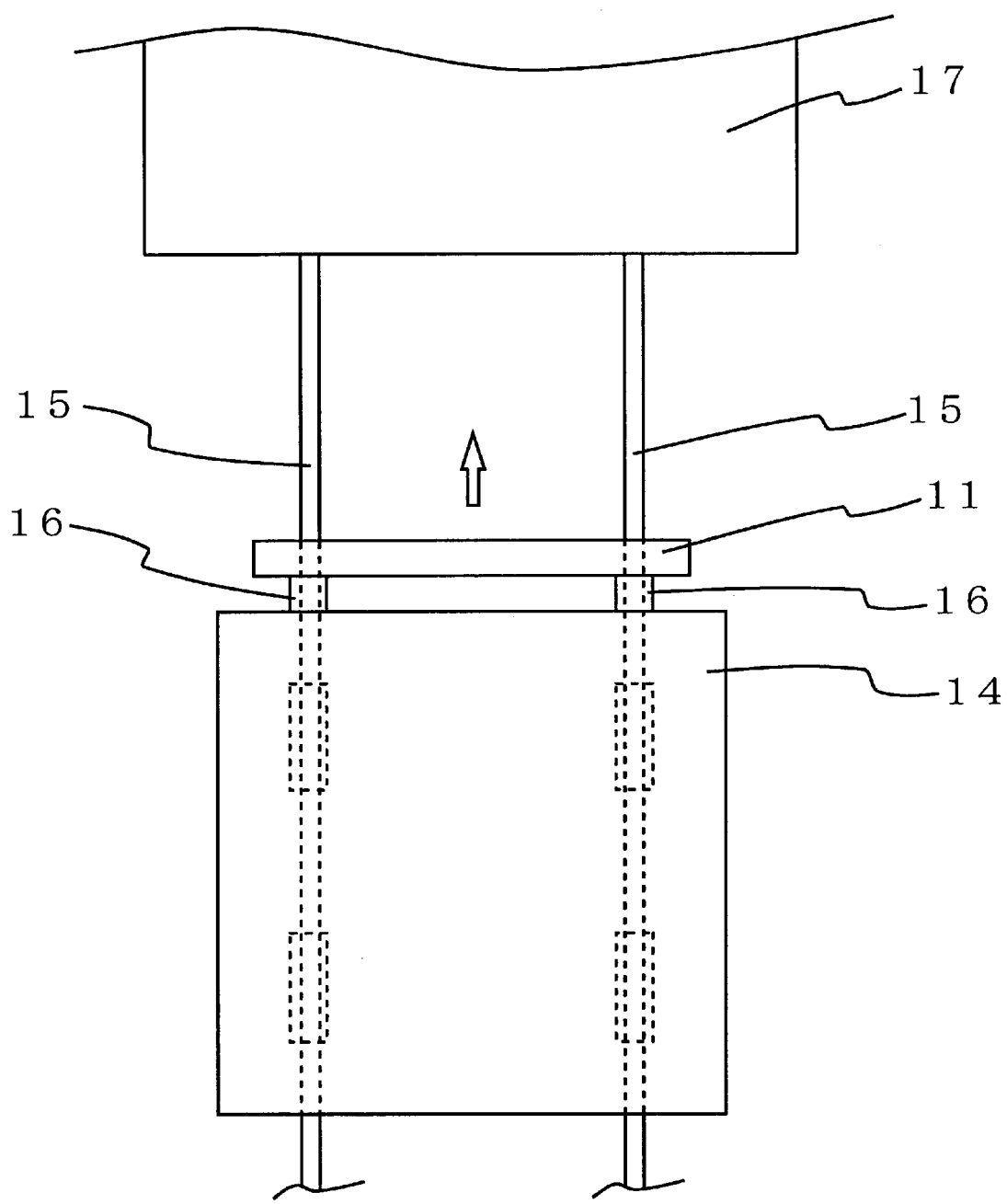
FIG. 5 is a top view of an apparatus which is used for the collision test of a bumper barrier.

The strength evaluation of the bumper 11 is made by means of bumper barrier collision or impact which is similar to the United States Federal Motor Safety Standards FMVSS215. As shown in FIG. 5, a pair of rails 15 and 15 is prepared which are fixed at one ends thereof with a stationary barrier 17. A wheeled cart 14 is mounted on the rails 15 and 15 so as to be movable therealong. The wheeled cart 14 is provided at its one end portion with a pair of bumper beam mounting portions 16 and 16 which are similar to vehicle side members, respectively, in function.

Each of the bumper beam mounting portions 16 has a width of 90 mm and a height which is larger than the height of the bumper beam 11.

A pitch or distance of 897 mm is set between the bumper beam mounting portions 16 and 16. The bumper beam 11 is secured to the bumper beam mounting portions 16 and 16 by bolts (not shown). When the wheeled cart 14 is brought into collision or crush with the stationary barrier 17 at a crush speed of 7.8–8.0 km/h, the resultant impact or load is measured or determined by a reaction force detecting device (not shown), thereby measuring a buckling load. The wheeled cart 14 has a mass of 1150 kg.

A bumper beam of the comparative example for the test is in the form of a rectangular prism and has a dimension of 60 mm width (horizontal length in FIG. 3 ×102 mm height (vertical length in FIG. 3)×1150 mm (length). As the raw material of the bumper beam of the comparative example, a steel sheet rated at SPCC980 according to Japanese Industrial Standard is used. This steel sheet has a thickness of 1.4 mm and a tensile strength of 980 MPa. A test is made which is similar to the above-mentioned test for measuring the buckling load of this bumper beam.

Table 1 listed below shows the results of the foregoing tests. No significant difference is found in strength or buckling load between the instant embodiment and the comparative example. Thus, even though the bumper beam is formed from the conventional low strength sheet steel provided with one or more locally reinforced portions thereof, the bumper beam has a buckling load which is substantially identical with that of the bumper beam which is formed from high strength steel sheet. In addition, the deformed characteristic of the low strength portion of the bumper beam absorbs the shock and produces an effect such that upon collision one or more passengers in the vehicle are protected in safely.

TABLE 1

|  | Buckling Load (kN) |
| --- | --- |
| Embodiment | 76.9 |
| Comparative Example | 76.6 |

In order to verify the effects of the present invention, strength test simulations, as virtual bumper barrier impact tests, are made by varying the amount of the reinforced or high strength portions and/or the thickness of the steel sheet. The simulation is made in such a manner that an assumed bumper beam is established in the form of a meshed structure by using a software named Hyper Mesh, the assumed bumper beam is amended or modified by a software named J-Vision, and an analysis is made by using a software named LS-DYNA.

For doing each simulations, the assumed or virtual bumper beam is made to have a cross-section which is identical with that shown in FIG. 3. The assumed or virtual bumper beam is formed into a rectangular prism and has a dimension of 60 mm width (horizontal length in FIG. 3) ×102 mm height (vertical length in FIG. 3)×1150 mm (length). Opposite ends of the assumed or virtual bumper beam are opened. The first high strength portion 71 and the second high strength portion 73 are arranged in plan symmetry. In the simulations, the tensile strength of each of the first high strength portion 71 and the second high strength portion 73 is set to be $\sigma$ MPa which is variable, the height of the first high strength portion 71 and the second high strength portion 73 is set to be L1 mm which is variable, the thickness of the steel sheet is set to be t mm, and the tensile strength of each of the first low strength portion 72 and the second low strength portion 74 is set to be a fixed value of 390 MPa.

Figure 6:
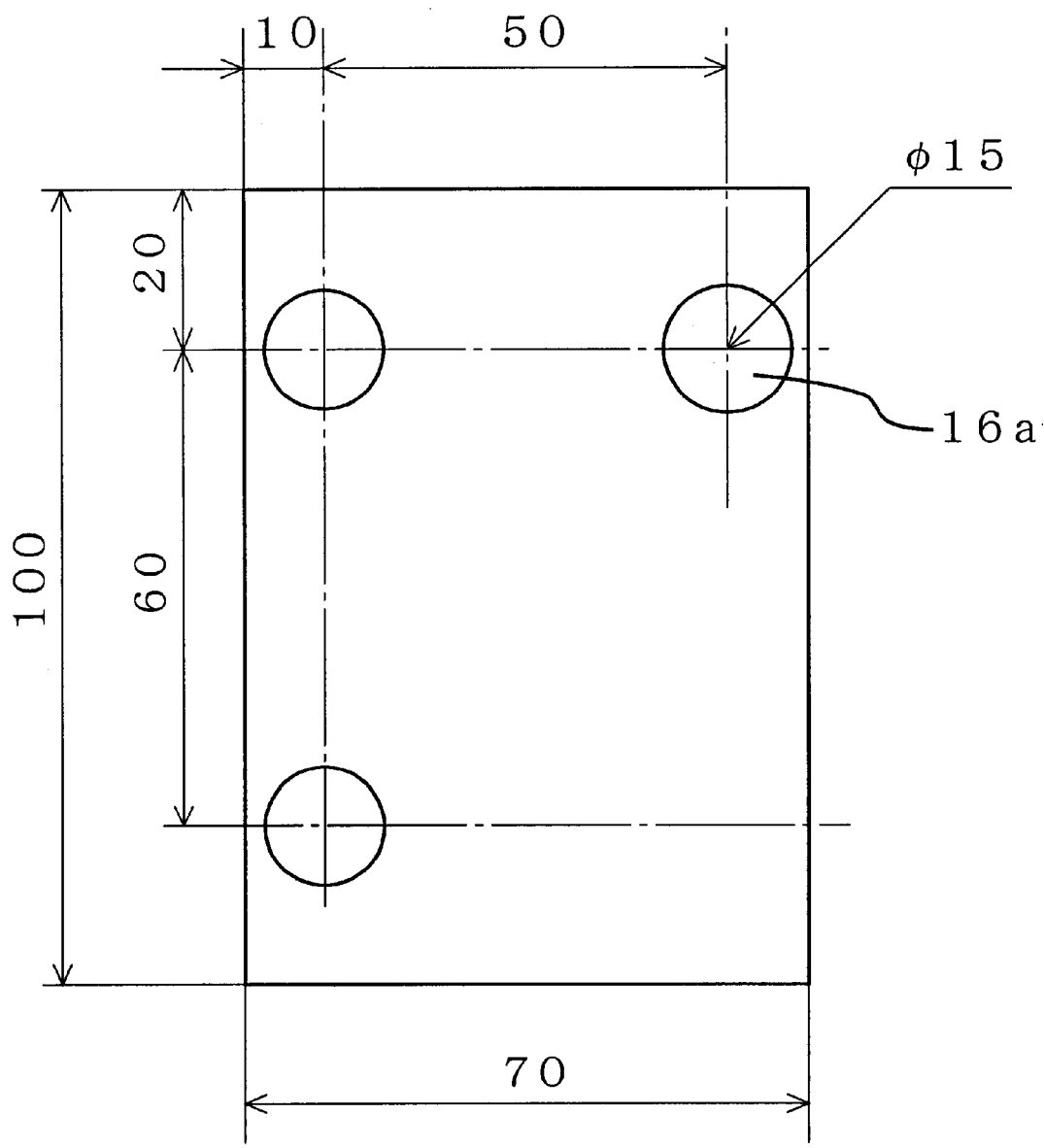
FIG. 6 illustrates a front view of a portion at which the bumper beam which is shown in FIG. 3 and a bumper beam mounting member are connected.

The simulation conditions for the virtual bumper barrier impact test from which the buckling load is derived are hereinafter explained with reference to FIG. 5. A pitch or distance of 897 mm is set between the bumper beam mounting portions 16 and 16. The crush speed of the wheeled cart 14 is set to be 7.0 km/h and the mass of the wheeled cart 14 is set to be 150 kg. As shown in FIG. 6, the bumper beam 11 is welded to the bumper beam mounting member 16 at three portions 16a each of which is of 15 mm in diameter.

Table 2 listed below shows the results of the simulations. In this Table 2, area ratio of high strength portion is defined as an occupation rate of the total area of the summation of the first strength portion 71 and the second strength portion 73 to the projected area when a projection is made from the right side in FIG. 3. This occupation rate can be expressed as a formula of $(2\times L1/(2\times L1+L2))$. When the high strength portion occupation rate is calculated to be 0%, this means that a roll-formed product or bumper beam without provision of reinforced or high strength portion. By contrast, a 100% high strength portion occupation rate means that the entire of the roll-formed product formed from low strength sheet steel is reinforced or the roll-formed product is formed from high strength sheet steel sheet.

TABLE 2

| | Tensile Strength σ (MPa) | Thickness of Steel Sheet t (mm) | Area ratio of High Strength Portion (%) | Buckling Load (kN) |
|---|---|---|---|---|
| Example 1 | 980 | 1.4 | 0.0 | 50.6 |
| Example 2 | 980 | 1.4 | 22.2 | 82.0 |
| Example 3 | 980 | 1.4 | 44.4 | 83.2 |
| Example 4 | 980 | 1.4 | 66.7 | 82.8 |
| Example 5 | 980 | 1.4 | 77.8 | 83.2 |
| Example 6 | 980 | 1.4 | 190.0 | 83.2 |
| Example 7 | 1180 | 1.4 | 44.4 | 103.6 |
| Example 8 | 1180 | 1.3 | 44.4 | 91.8 |
| Example 9 | 1180 | 1.2 | 44.4 | 75.8 |
| Example 10 | 1274 | 1.2 | 44.4 | 80.6 |

Figure 7:
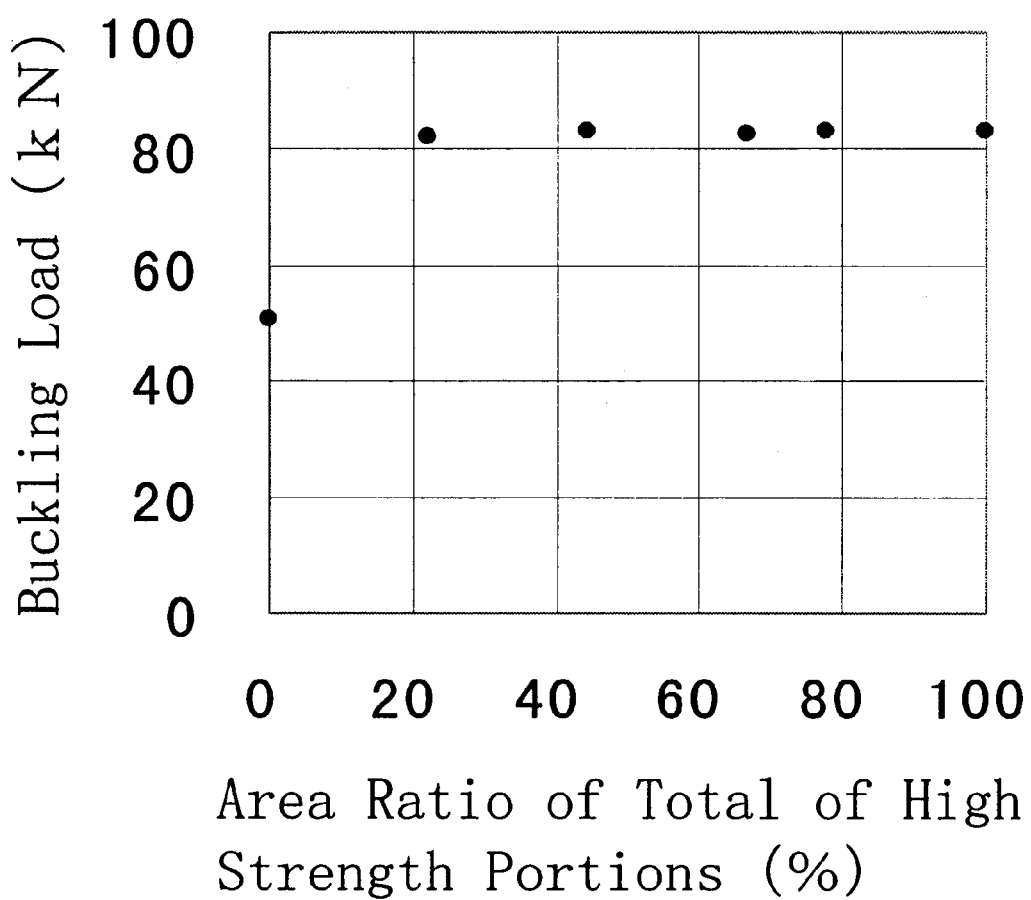
FIG. 7 illustrates a graph which represents a relationship between area ratio of high strength portion and buckling strength when the tensile strength of the high strength portion is 980 MPa and the thickness of a steel sheet is 1.4 mm.

FIG. 7 shows a relationship between the area ratio of the high strength portion (Y-axis) and the buckling force (X-axis) when the high strength portion has a tensile strength of 980 MPa and the steel sheet has a thickness of 1.4 mm. When the area ratio of the strength portion is equal to or greater than 20%, the roll-formed product with strength portion which is formed from low strength steel has as same buckling load as the roll-formed product formed from high strength steel and is more than 60% higher than the roll-formed product without strength portion which is formed from low strength steel.

Thus, it becomes possible to fabricate the high strength roll-formed products from low strength sheet steel which is inexpensive and which is easy to form or bend. In addition, straining the low strength portion makes it possible to absorb the shock.

Further increasing the tensile strength of the high strength portion secures enough or sufficient buckling load. For example, in the foregoing example 8 wherein the thickness of the steel sheet is 1.3 mm and the foregoing example 10 wherein the thickness of the steel sheet is 1.2 mm, the buckling loads are 91.8 kN and 80.6 kN, respectively, which means that each of these examples has as same buckling load as the roll-formed product which is formed from high strength steel, thereby decreasing the thickness of the steel sheet. Thus, saving the raw material of the steel sheet, reducing the production cost of the roll-formed product, improving the formability of the roll-formed product, and making the roll-formed product much lighter can be realized. Especially, when the roll-formed product is used as a core element or component of a vehicle bumper, the resultant lightweight vehicle bumper improve the vehicle fuel economy, thereby establishing the energy-saving.

Similar to the foregoing simulations, other simulations are made with usage of the same software packages when a mechanical or concave reinforced or strength portion is employed instead of the foregoing heat-treated reinforced or strength portion.

Figure 8:
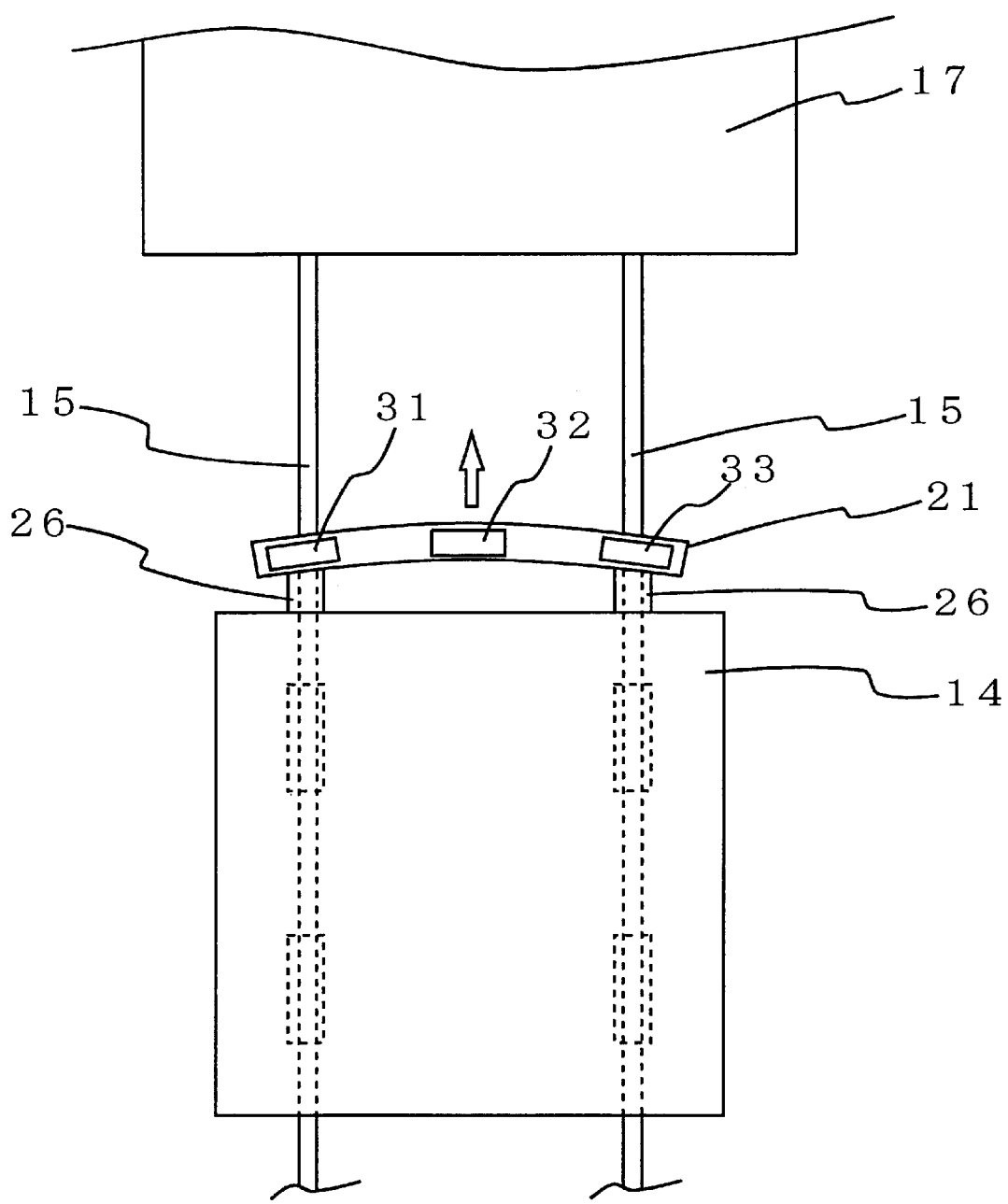
FIG. 8 illustrates a top view of the apparatus when a collision test of another bumper barrier is conducted.

In the latter, as shown in FIG. 8, a bumper beam 21 is assumed which is swept into a curvature corresponding to the outer profile of the frontward of the vehicle. The bumper beam 21 for the analysis is obtained in such a manner that a rectangular prism having a dimension of 60 mm (width)× 102 mm (height)×1149 (length) is swept to have a curved length of 1940 mm. Opposite ends of the bumper beam 21 are opened. The steel sheet has a thickness of 1.4 mm. Like the foregoing simulations, the bumper beam 21 is secured to the wheeled cart 14 by way of the mounting members 26 and 26. It is to be noted the mounting members 26 and 26 are slightly modified to meet the curvature of the bumper beam 21. The pitch between the mounting members 26 and 26 is set to be 866 mm, the wheeled cart 14 is set to have a mass of 1150 kg, and the collision or crash speed is set to be 22 km/h, for the following simulations.

The bumper beam 21 for the following simulation example 11 has a cross-section similar to that shown in FIG. 3 and has a first high strength portion 71, a second high strength portion 73, a first low strength portion 72, and a second low strength portion 74. The first high strength portion 71 and the second high strength portion 73 have a tensile strength of 980 MPa and a height L1 of 22 mm, while the first low strength portion 72 and the second low strength portion 74 have a tensile strength of 390 MPa and a height L2 of 58 m.

Figure 9:
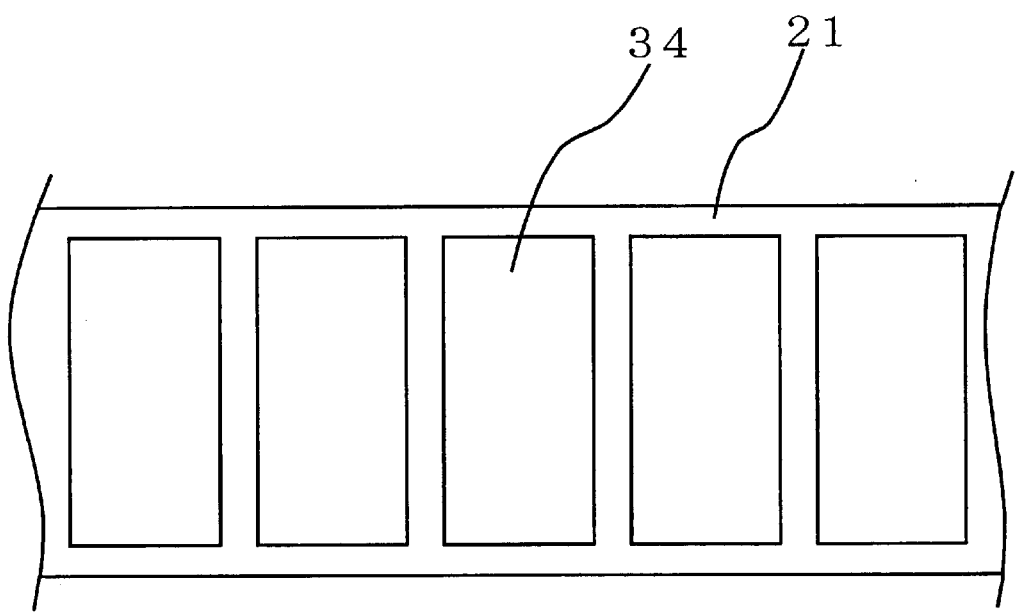
FIG. 9 is a top view of an region in the vicinity of reinforced portions of the bumper barrier shown in FIG. 8.

As shown in FIG. 8, three reinforced portions 31, 32, and 33 are provided on each of upper side and lower side of the bumper beam 21 for strengthen the same. As can be seen from FIG. 9, each of the reinforced portions 31, 32, and 33 is made up of five equally spaced concave portions 34 which extends in the lengthwise direction of the bumper beam 21. The concave portion 34 has a dimension of 24 mm (lengthwise direction)×50 mm (perpendicular thereto)×3 mm (inward extension or projection). Between the two adjacent concave portions is set to be 6 mm. As a whole, each of the concave portions has a longitudinal direction of 144 mm. The curvature of the each of the reinforced portions 31, 32, and 33 is identical with the curvature of the mounting element 26. The reinforced portion 32 is placed at a center portion between the mounting members 26 and 26.

Figure 10:
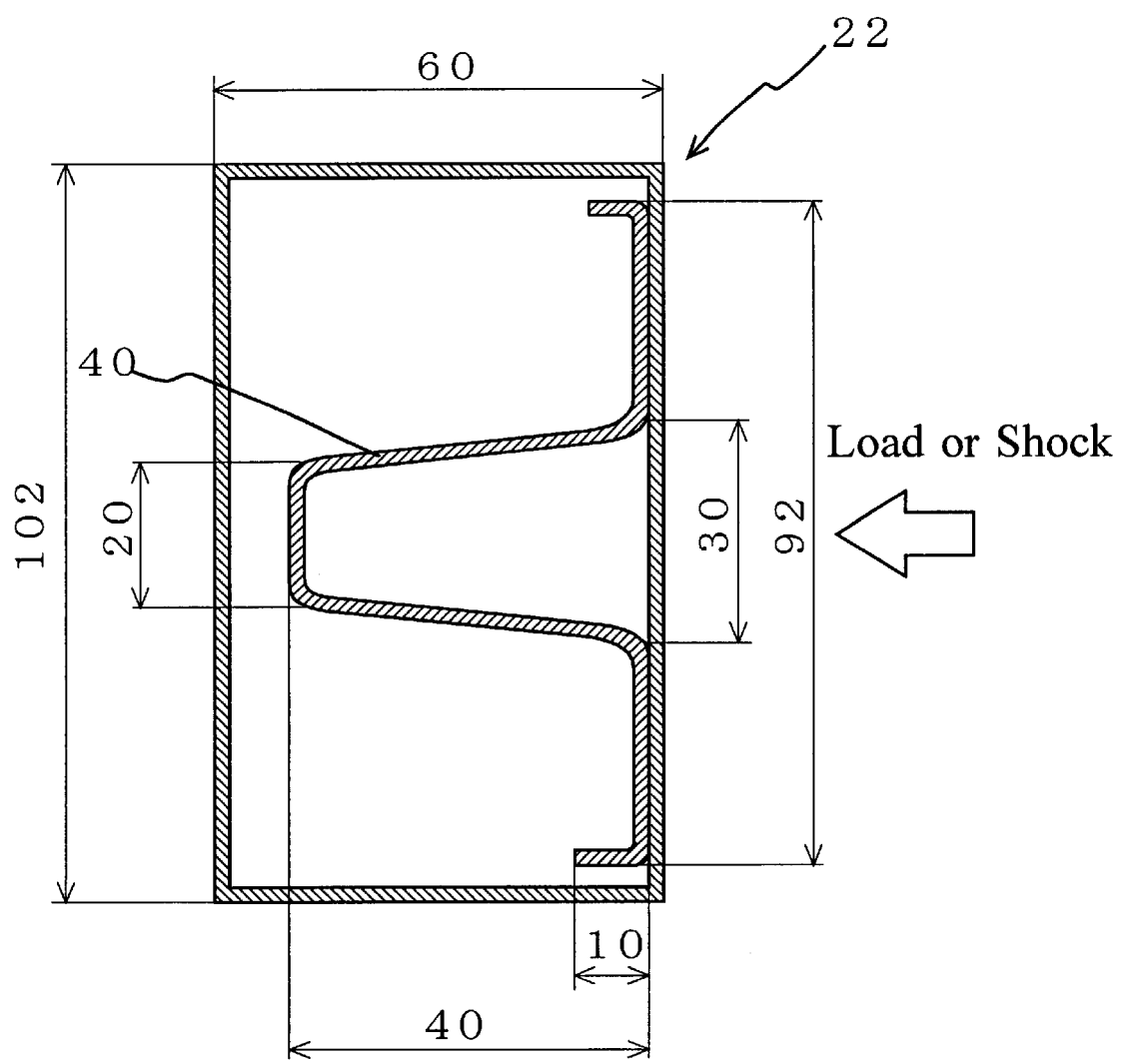
FIG. 10 illustrates a vertical cross-sectional view of another bumper beam which is provided with a reinforcing member.

FIG. 10 shows a cross-sectional view of a bumper beam 22 which is used in a simulation example 12. The bumper beam 22 is a model version and is provided with a reinforcing member 22 having a substantially hat-shaped configuration as shown in FIG. 10. The reinforcing member 40 is formed from a steel sheet having a thickness of 1.4 mm and is secured to a side of the bumper beam 22 which is to receive an inner side shock. Similar to the reinforcing portions 31 and 33, the reinforcing element 40 is so placed as to be in axial alignment with the mounting member 26.

The bumper beam 22 has an outer profile which is identical with the outer profile of the bumper beam 11. The simulation example 12 is identical with the simulation example 11 in conditions. Table 3 which is listed in the next page shows the results of the respective simulation examples 11 and 12.

TABLE 3

|  | buckling load (kN) |
| --- | --- |
| Example 11 | 102.0 |
| example 12 | 97.1 |

Table 3 reveals that the buckling load of the example 11 is larger than that of the example 12 which is prepared by adding the reinforcing member to the bumper beam. Thus, the present invention makes it possible to reinforce a rolled-formed product by providing an integral concave portion not by adding a reinforcing member, thereby making the roll-formed product much lighter. When such a roll-formed product is used as a vehicle component such as a bumper, improving the fuel economy becomes possible, which results in energy-saving. In the present invention, the concave portion 34 of the example 11 is formed to the roll-formed product. Such a formation can be made at a low cost. Of course, instead of the concave portion, a convex portion is available which produces the same results. However, forming the concave portion to the roll-formed product fails to stick out therefrom and is placed within the outer profile of the roll-formed product, which results in advantageously that the relationship between the roll-formed product and other elated components remains unchanged.

Regardless of the longitudinal tubular bumper beams having a rectangular cross-section which are explained in the foregoing embodiment and simulation examples, the roll-formed products in accordance with the present invention can be of any configuration which has a complex cross-section. In addition, unlike the same height structure of the first strength portion and the second strength portion, differentiating the height of the first strength portion from that of the second strength portion is acceptable. Moreover, it is possible to vary the height of the first strength portion and the second strength portion along the longitudinal direction.

As described above, the gist of the present invention can be applied to a roll-formed product which is in the form of a tubular structure formed from a steel sheet. The roll-formed product in accordance with the present invention has an unlimited uses so long as the product is used in the possibility of receiving a load or shock. Other uses in the automotive vehicles are a side panel outer, a front side frame, a rear side frame, a front cross member, a center cross member, a rear cross member, a door impact bar, a front bumper beam, a rear bumper beam, and so on.

The invention has thus been shown and description with reference to specific embodiments, however, it should be understood that the invention is in no way limited to the details of the illustrates structures but changes and modifications may be made without departing from the scope of the appended claims.

What is claimed is:

1. A roll-formed product comprising:

a main body formed from a steel sheet having a tensile strength of not greater than 400 MPa; and one or more locally reinforced portions provided to the main body, wherein the main body is made up of a first high strength portion extending in a lengthwise direction and strengthened, a first low strength portion extending in the lengthwise direction continuous with the first high strength portion such that a strength of the first low strength portion remains unchanged, a second high strength portion extending in the lengthwise direction continuous with the first low strength portion and strengthened, and a second low strength portion extending in the lengthwise direction continuous with the second high strength portion such that a strength of the second low strength portion remains unchanged, the main body being characterized in that a summation of a projection area of the first high strength portion and a projection area of the second high strength portion occupies 20% or above of a projection region whose one end portion perpendicular to the lengthwise direction, a central portion, and the other end portion perpendicular to the lengthwise direction are in coincidence with the first high strength portion, either of the first low strength portion and the second low strength portion, and the second high strength portion, respectively.

2. A roll-formed product as-set forth in claim 1, wherein at least one of the first high strength portion and the second high strength portion is in the form of either of a concave configuration and a convex configuration.

3. A roll-formed product as set forth in claim 1, wherein the first high strength portion and the second strength portion are reinforced by means of heat treatment of the main body.

4. A roll-forming product as set forth in claim 3, wherein the heat treatment is high-frequency quenching hardening.

5. A roll-forming product as set forth in claim 1, wherein the main body is used as a bumper beam of a vehicle bumper.

6. A roll-forming product as set forth in claim 5, wherein the bumper beam is provided with a bumper cover for absorbing a shock upon collision.

7. A roll-formed product as set forth in claim 1, wherein the main body is in the form of a tubular body.

8. A roll-formed product as set forth in claim 7, wherein opposite end portions of the tubular body are opened.

\* \* \* \* \*

UNITED STATES PATENT AND TRADEMARK OFFICE
CERTIFICATE OF CORRECTION

PATENT NO. : 6,325,431 B1  
DATED : December 4, 2001  
INVENTOR(S) : Haruki Ito

Page 1 of 1

It is certified that error appears in the above-identified patent and that said Letters Patent is hereby corrected as shown below:

<u>Title page,</u>
Item [30], the second Foreign Application Priority Data is corrected to read:

-- Jan. 31, 2000  (JP) .................... 2000-021555 --

Signed and Sealed this

Ninth Day of April, 2002

Attest:

Attesting Officer

JAMES E. ROGAN
Director of the United States Patent and Trademark Office